United States Patent Office 3,031,554
Patented Apr. 24, 1962

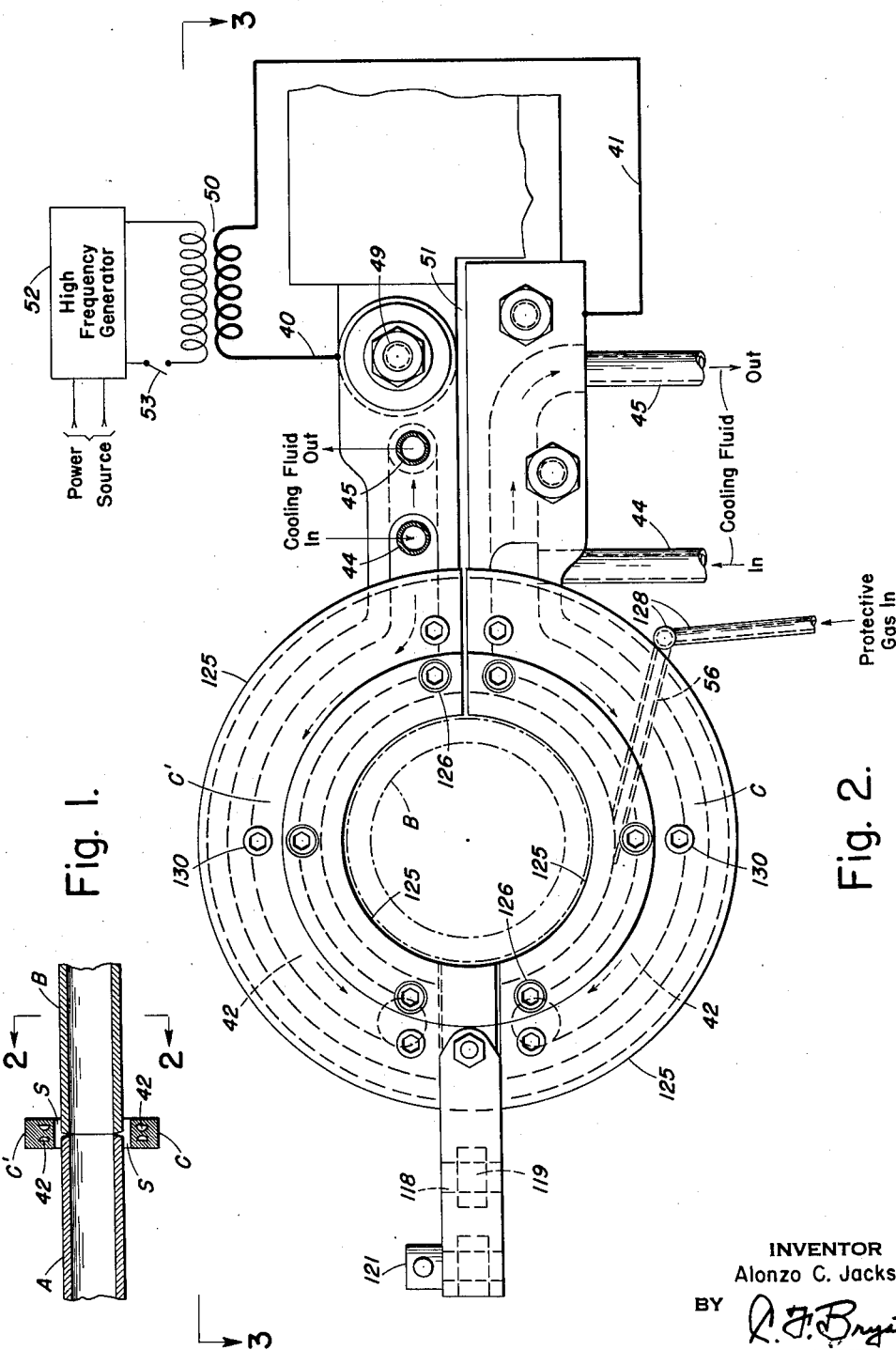

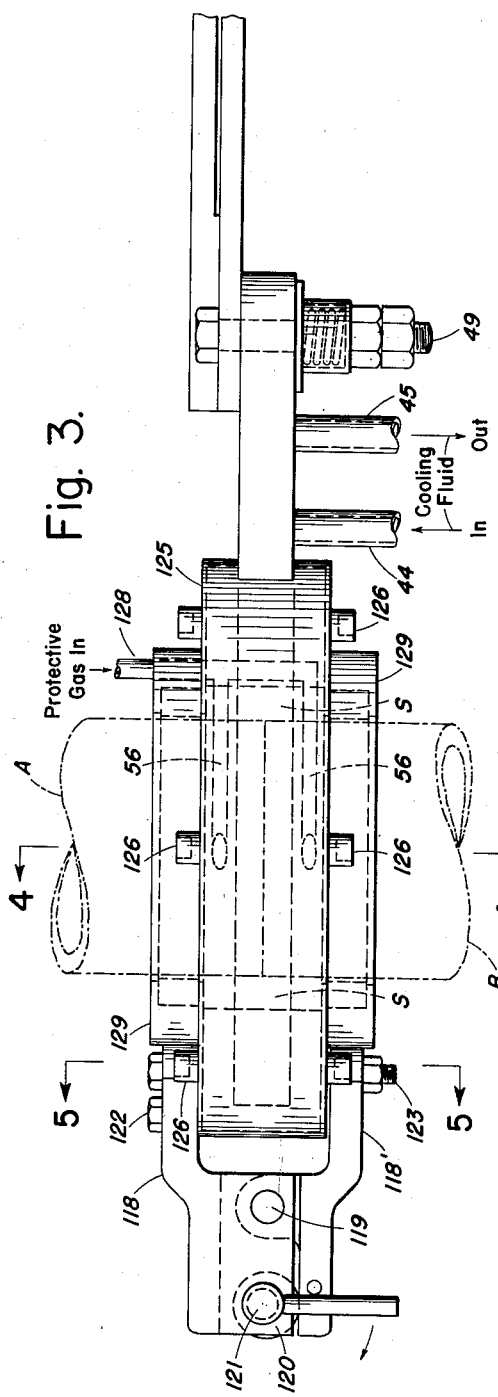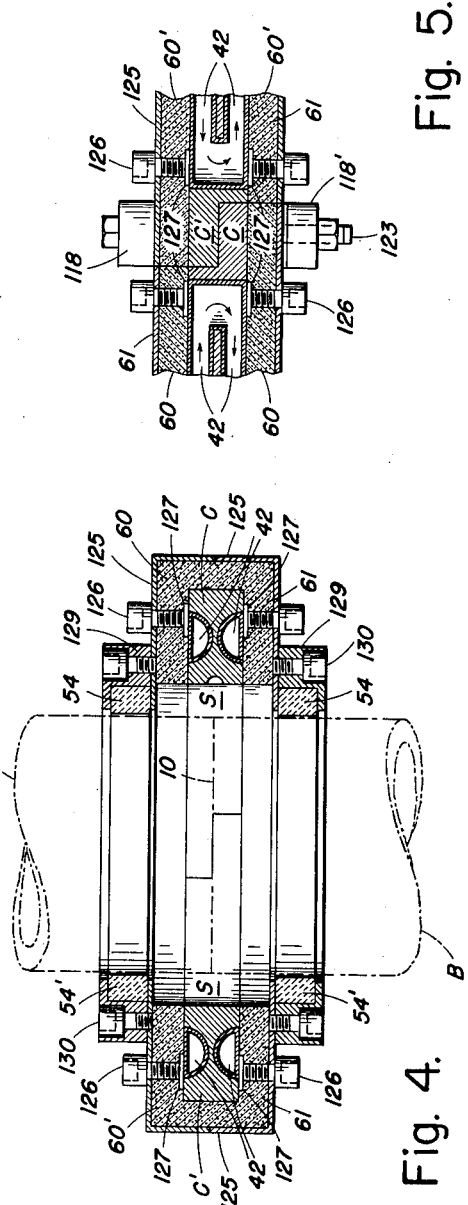

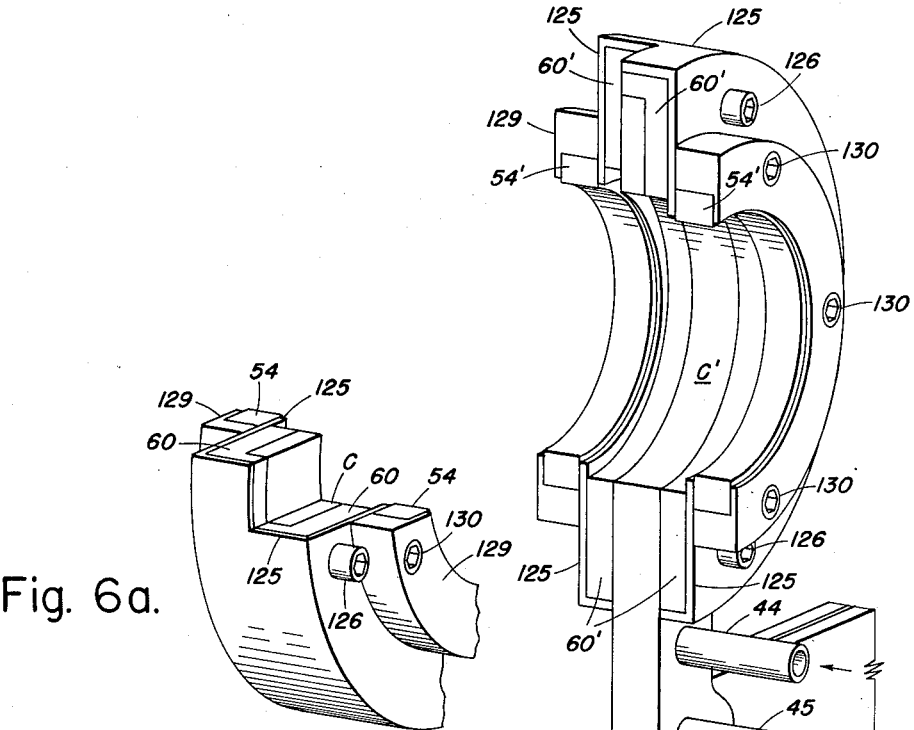
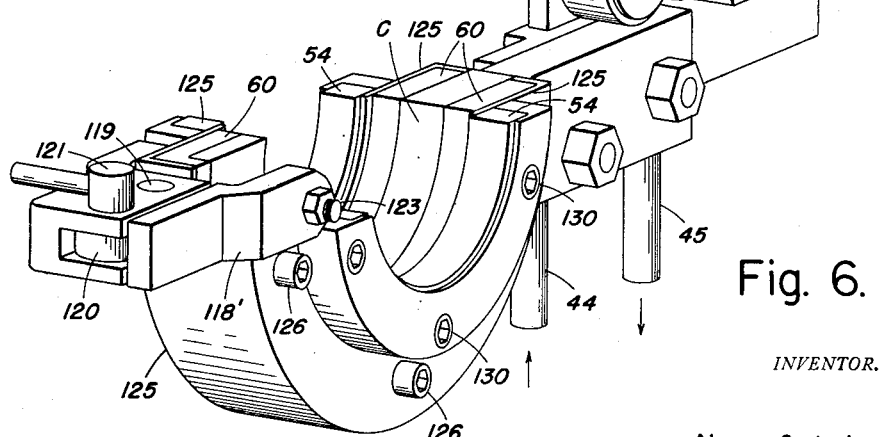
Fig. 6a.
Fig. 6.
INVENTOR.
Alonzo C. Jackson

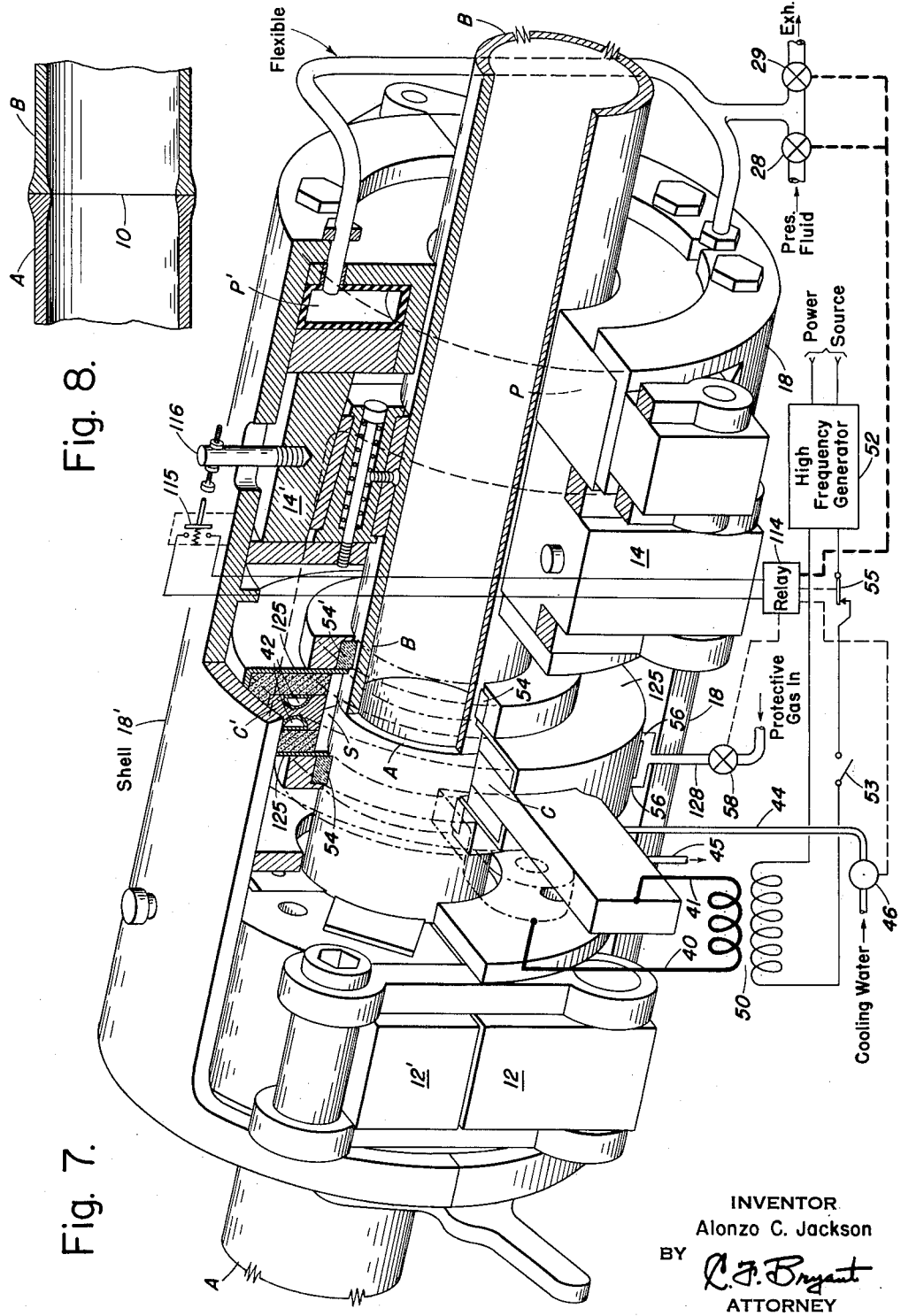

3,031,554
PRESSURE INDUCTION WELDER HEATING COIL HAVING INTEGRAL FLUX CONCENTRATORS WITH GAS CHAMBER AND SELF-CENTERING MEANS
Alonzo C. Jackson, Chattanooga, Tenn., assignor to Combustion Engineering, Inc., New York, N.Y., a corporation of Delaware
Filed Dec. 9, 1959, Ser. No. 858,543
2 Claims. (Cl. 219—9.5)

This invention relates to welding metal bodies by the aid of electrical energy inductively transmitted thereto, and it has special reference to butt welding the ends of metal tubes through employment of high frequency electrical induction to heat the tube end metal to welding temperature.

Broadly stated, the object of this invention is to provide improved technique and apparatus for butt welding tube ends by induction heating in the general manner disclosed by U.S. Patent 2,542,393, issued February 20, 1951, to E. C. Chapman under title of "Apparatus for Welding," and by U.S. Patent 2,649,527, issued August 18, 1953, to E. C. Chapman and R. E. Lorentz under title of "Butt Welding Tube Ends by Induction Heating."

A more specific object is to keep the band of inductive heating applied to the tube ends sufficiently narrow so that objectionable flaring of the tube metal will not occur when those ends are pressed together after the temperature thereof has been raised to welding value.

Another object is to provide an improved induction heating coil assemblage for encircling the extreme edge portions of the tube ends that are to be welded together which assemblage insures a concentric positioning of those ends within the coil conductor at all times.

A further object is to provide improved flux concentrator means which are integrally attached to the coil conductor metal and which narrow the axial confines of the high frequency alternating magnetic flux that the encircling conductor passes through said edge portions in inductively heating them to welding temperature.

A still further object is to organize the inductor coil and flux concentrators in a novel way which permits cooling of the concentrator elements by the same means that are employed to cool the coil metal, whereby said flux concentrator elements can satisfactorily remain in the apparatus for the full duration of the welding cycle without overheating.

An additional object is to provide improved gas chamber means integral with the coil and the concentrators for bathing the tube end metal in a protective atmosphere which prevents air contamination of that metal at the high temperatures encountered during the welding.

Other objects and advantages of the invention will become apparent as the disclosure and description hereof proceeds.

Illustrative embodiments of the improved tube welding technique and of apparatus suitable for practicing same are shown by the accompanying drawings wherein:

FIG. 1 is a simplified cross sectional view showing how the inductor heating coil is positioned around the two tube ends to be welded, but omitting essential associated elements as utilized by the invention;

FIG. 2 is a sectional elevation, as taken from line 1—1 of FIG. 1, showing an illustrative split construction for my new inductor heating coil, and also diagramming typical circuits for supplying high frequency current to the inductor;

FIG. 3 is a top plan view from line 3—3 of FIG. 1 of my improved inductor heating coil apparatus;

FIG. 4 is a section on line 4—4 of FIG. 3 showing further details of the coil and of the protective gas spaces formed between it and the abutted ends of the tubes that are to be welded;

FIG. 5 is a section on line 5—5 of FIG. 3 showing how the two free ends of the split inductor coil are lapped and held together by clamping means;

FIG. 6 is a perspective showing of the two coil halves and associated flux concentrators when same occupy the open position;

FIG. 6a is a similar showing of the lower coil half free end before the clamping device has been installed thereon;

FIG. 7 is a perspective view with certain parts cut away showing how the coil with novel flux concentrator means and gas chamber of the earlier views can be installed and utilized in operable welding apparatus that includes clamp blocks for the two tube ends plus pressure applying means and other cooperating elements; and FIG. 8 is a cross sectional view corresponding to FIG. 1 but differing therefrom by showing the two tube ends abutted together in finally welded position.

*The Welding Facilities Here Disclosed*

In the drawing views hereof, the abutted tube ends to be welded are shown at A and B. These two tube ends are mounted in alignment in any suitable apparatus, one illustrative embodiment of which is shown by FIG. 7 reproduced from a copending application No. 858,544, filed in the names of A. C. Jackson, J. H. Hunt and L. A. Maier, under title of "Compact Pressure Induction Welding Apparatus for Portable and Other Use."

This FIG. 7 apparatus includes separate clamping blocks 12—12' and 14—14' which respectively engage the two abutted tubes A and B. Both blocks are supported in an openable shell 18—18'. The left block 12—12' is stationary while the right block 14—14' is movable at proper times under the pneumatic action of expansible envelopes P—P' in a direction axial with the tubes so as to press them into physical contact for welding.

To clarify explanation, it will be assumed that these tubes A and B to be welded are of the type used in steam generating boilers and the like; such tubes being formed of iron or steel and having a wide variety of diameters and wall thicknesses. As the description hereof proceeds it will become apparent that the technique and apparatus herein disclosed may also be used to weld the ends of tubes of metal other than iron or steel.

*New Inductor Heating Coil, Encircles Tube Ends*

Electrical energy for heating the end metal of aligned tubes A and B is transmitted thereto from an induction coil C—C' mounted to surround those abutting tube ends in the concentric manner shown. This coil has the comparatively narrow width indicated, and it may satisfactorily be made of copper. It comprises the two halves designated C and C'. The upper half C' is swingable at proper times upwardly away from the lower half C to the open position of FIG. 6 around a pivoting bolt 49.

The two free ends of coil halves C—C' are joined together as shown at the left of FIGS. 2–3 and by FIG. 5 to form the single continuous turn which FIG. 2 represents. The unjoined coil ends (right of FIGS. 2 and 6) are separated one from another by suitable electrical insulation 51 interposed therebetween.

To prevent this single-turn coil C—C' from overheating, each of the two halves thereof is provided with inner hollowed portions 42 through which water or other cooling fluid may be passed in the manner indicated by the small arrows of FIGS. 2 and 3.

Each of these cooling passages 42 may satisfactorily have semicircular cross section indicated, with its flat face portion lying in the same plane as the outside surface as the coil conductor C—C'. Other designs for these cooling passages 42 are of course possible and may be substituted.

Water at room temperature or below may satisfactorily be used as the cooling fluid mentioned above. Inlet and outlet connections for such water are shown at 44—45 in each of FIGS. 2, 3, 6 and 7.

The inner portion of this induction coil C—C' is made somewhat larger than the tube ends A and B immediately surrounded so as to provide between the coil and the tube metal a clearance of the general order indicated at S in FIGS. 1, 3, 4, and 7. This space S receives protective gas during the welding operation, as will be more fully described presently.

Referring to FIG. 5, the free ends of coil halves C—C' are shaped to provide a lapped joint which the two jaws of a clamp 118—118' serve to press together as best shown by FIG. 3. These two clamp jaws are pivoted by pin 119, and the free ends thereof can be spread apart by toggle 120 mounted on shaft 121 that is turnable by the represented handle. One clamp jaw 118 is attached to lower coil half C by bolt 122 as shown in FIGS. 3 and 6. The other clamp jaw 118' is provided with an adjusting screw 123 to give proper pressure between the lapped coil ends (FIG. 5) when the eccentric 120 is turned to the squeeze position of FIG. 3.

Such pressure establishes contact electrically between the lapped free ends of the two coil halves C—C'. To release those ends it is only necessary to turn the shaft 121 clockwise in FIG. 3. The raised portion of cam 120 is now moved away from the clamp half 118' and the pressure between the lapped coil ends (FIG. 5) is released. The upper coil half C' now can be swung away from the lower half C, as shown in FIG. 6.

The other or unjoined ends of coil halves C—C' (shown at the right of FIG. 2) are connected with a source of heating current diagrammed in FIG. 2 as including a transformer 50 whose low voltage and high amperage secondary winding is directly joined with said coil ends via conductors 40 and 41. The conductor 40 connection passes through the hinge bolt 49 around which the upper coil half C' can be opened upwardly, as in FIG. 6, when it is desired to remove the welded pipe lengths A and B (FIG. 8) from the apparatus.

The primary winding of transformer 50 is energized from a high frequency generator of the oscillation or other type designated generally at 52 in FIGS. 2 and 7. Since such generators are well known, no attempt to illustrate details is here made; instead it will be sufficient to say that upon closure of a switch 53 generator 52 supplies transformer 50 with alternating electrical current of relatively high frequency typified by several thousand cycles per second (10,000 may be taken as illustrative). The intensity of this heating current as transmitted by transformer 50 to inductor coil C—C' is adjusted so as to produce the requisite heating of tube ends A and B as will later be explained, this adjustment being accomplished in well known manner.

*Novel Flux Concentrating Material Flanks the Sides of Inductor Coil C—C'*

One of the past difficulties, particularly in welding thin-walled tubes, has been to keep the band of heating flux sufficiently narrow so that objectionable flaring of tube metal will not occur when the heated tube ends are pressed together after the temperature thereof has been raised to welding value. In accordance with this invention the desired narrowing of the flux band is achieved by encasing the left and right faces of the outer peripheral sides of each coil half C—C' with material 60—60' consisting of a cement base or binder in which powder-like particles of iron 61 of proper composition (such as pure iron) are embedded in such a manner as to be individually separated and hence electrically insulated one from another. Such particles 61 are extremely small (as passable through a sieve having 200 meshes per sq. inch); and a sodium silicate type of binder may satisfactorily be used therewith in this material 60—60'.

As is indicated by FIGS. 4, 5, 6 and 7, each of these U-shaped sections of flux concentrating material 60—60' is flanked and surrounded by metal sheeting 125 of non-magnetic material such as stainless steel. Such sheeting 125 has its inner edges shaped to fit around the tubes A and B with a clearance of about 1/16 inch (see FIGS. 2 and 4). These left and right sheets 125 of the inductor housing serve to define around the abutted tube ends the earlier mentioned space S into which protective gas is admitted, as later described.

The flux concentrating material 60—60' as so encased by nonmagnetic housing 125 is firmly bonded and otherwise secured to each of the upper and lower coil halves C—C' so that both of the upper and lower assemblages are unitary or integral in character. This results from the fact that the binder and iron particle material 60—60' is directly cast around its associated coil half C—C' and thus intimately bonds itself to the coil metal in which the cooling ducts 42 are imbedded. Prior to such casting the coil halves C—C' are properly centered and held in place inside the inductor housing 125 by means of threaded studs 126 screwed through the housing sides, as shown in FIGS. 4 and 5, until their ends bear against insulating pads 127 on the coil metal sides. Such pads 127 electrically insulate said housing 125 from the coil C—C', thereby safeguarding the metal housing parts from the objectional heating to which they otherwise would be subjected.

By reason of the individual magnetic metal particles 61 in the insulating binding, U-shaped material sections 60—60' each provide left and right side paths through which the magnetic flux set up by passage of high frequency current through conductor C—C' is effectively transmitted to the metal in the aligned ends of tubes A and B. Such transmitted flux then returns to the inner or copper-metal portion of coil C—C' through the gap shown at S as separating the extreme end edges of tubes A and B from the inner periphery of conductor C's inside portion.

In this way the magnetic flux which serves to heat the ends of tubes A and B is effectively concentrated into the extreme end portions of those ends with the desired narrowing of the heating hand width. In consequence of such narrowing, objectionable flaring of the tube metal will not occur when these heated ends of tubes A and B are pressed together after the temperature thereof has been raised to welding value.

A highly significant advantage of the new coil C—C' and flux concentrator 60—60' assemblage is that the same cooling fluid which passes through the ducts 42 of the coil metal also serves to carry heat away from the flux concentrating material 60—60'. Such latter cooling permits said material 60—60' to remain in the assemblage during the full duration of the welding cycle.

This has not been possible in earlier flux concentrating organizations, such for example as the one shown by Chapman et al. Patent 2,649,527 of 1953. There the side assemblages 32 and 34 of laminated sheet iron must be physically removed from the coil C1—C2 before end of the welding cycle, otherwise damaging overheating thereof will occur.

Such requirement for early removal has been one factor in preventing the flux concentrator means of that earlier Chapman et al. patent from being put to extensive use in pressure induction welding units, such as of the compact and rugged type which FIG. 7 hereof shows and which the copending application Serial No. 858,544 illustrates and describes in greater detail; another factor has been the impracticability of constructing a protective gas chamber (corresponding to S hereof) around the sheet-lamination assemblages 32 and 34 of the Chapman et al. organization.

Protective Gas Bathes the Tube Ends During Heating

The complete inductor coil assemblage C—C' also includes provision for bringing into the space S around the abutted tube ends A and B a protective gas which prevents air contamination of the tube end metal at high temperatures encountered during welding. In my new organization, such gas is admitted into the said space S via two tubes 56 which enter along the left and right of the lower coil half C from the outside as best shown in FIGS. 2–3 and discharge into said space S below the abutted tube ends. These two tubes 56 are fed by a supply header 128 (FIGS. 2–3).

By reason of the tangential approach of tubes 56 to their discharge points the protective gas thus admitted flows through space S in a generally circumferential direction which promotes more intimate contact of the gas with the metal of the abutted tube ends. Those tube ends are beveled so as to leave an included angle of about 3° opening towards the outside encircling inductor coil C—C', thus permitting such swirling gas to penetrate between the beveled ends and thus protect the metal from oxidation at the high welding temperatures.

Side confinement of said swirling protective gas is partially provided by the aforementioned plates 125 of nonmagnetic metal which flank the left and right sides of the flux concentrating material 60—60'. This protective gas does not escape from space S in objectionable quantities along the tube outsides because only a small volume of such gas under comparatively low pressure is needed to completely purge said space of the original atmospheric air and provide protection during the weld cycle.

New Coil Assemblage Serves to Self-Center Itself Around the Encircled Tubes

Flanking the two outer sides of said casing plates 125 are left and right ring inserts 54—54' here illustratively shown as being of ceramic material or other insulating substance capable of withstanding high temperature. Each of these ring inserts 54—54' is held against its associated plate 125 by an L-shaped section of metal 129. Each of these insert holders 129 in turn is secured to the casing plate 125 beneath ring inserts 54—54' by means of bolts 130. Other equivalent constructions (not here shown) for accomplishing the same purpose are of course possible.

Each ceramic insert 54—54' is of smaller inside diameter than the two metal members 125 and 129 which flank it; thereby holding the surrounded tubes A and B out of contact with those members at all times. Such side ring inserts 54—54' thus serves to electrically insulate the inductor housing 125 from the surrounded tubes A and B, thereby safeguarding the metal housing parts from the objectionable heating to which they otherwise would be subjected.

These same inserts 54—54' also make the entire coil C—C' assemblage self aligning with respect to the ends of those tubes A and B. Closing of the top coil half C' down over the lower coil half C fits the ceramic inserts 54—54' closely around the tubes A and B and thus assures that the coil is properly centered around those abutted tubes, so that space S has the same size throughout the entire circumference of coil and tubes. This is important to assume equal heating around the entire weld juncture.

How the Complete Welding Installation Operates

In utilizing the apparatus here disclosed for butt welding the ends of metal tubes A and B, these tube ends are first given the slight bevel earlier described. They then are placed in their respective clamping blocks 12—12' and 14—14' (FIG. 7) and thereby positioned in the general manner indicated by FIG. 1. Initial abutting contact of those tubes along line 10 inside the inductor coil C—C' is ordinarily satisfactory.

Thus prepared, the two metal tubes A and B are secured into their supporting blocks 12—12' and 14—14'. The two halves C—C' of the inductor coil are then brought together around the tube ends A and B as shown in FIG. 2 and clamped together at 118—118' (FIG. 3) to complete the current flow path from the secondary winding of transformer 50.

Cooling fluid is then made available to the passages 42 of the coil halves via the opening of a valve shown at 46 in FIG. 7. Also, protective gas is admitted through valve 58 of FIG. 7 into the space S between the abutted tube ends and the inner periphery of coil C—C'.

The high frequency generator 52 is now activated at switch 53 causing transformer 50 to flow through the upper and lower coil halves C—C' a high frequency alternating current which is effective to heat the extreme end portions of tubes A and B to welding temperature. Such temperature may be of the order of 2300 to 2400° F. and it is accompanied by an intensely bright red glowing of the heated tube end metal.

Still referring to FIG. 7, pressure fluid next is admitted into the expansible envelopes P—P' by opening valve 28 and closing valve 29. In expanding, envelopes P—P' move clamp block 14—14' to the left and force the heated end of movable tube B against the heated end of stationary tube A. Under such application of heat and pressure the two tubes are welded together at 10 in the manner shown by FIG. 8.

Once the desired degree of upset at the weld juncture 10 has been achieved, the pressure fluid supply to envelopes P—P' is cut off by closing valve 28 and opening valve 29. Such actions may be initiated either manually or by the automatic facilities of FIG. 7.

Such automatic facilities include an upset switch 115 which closes its contact upon advancement to the left of pin 116 along with the clamp block 14—14', and that closing in turn causes a relay 114 to accomplish the closing of pressure fluid valve 28 and the opening of exhaust valve 29 earlier mentioned, with removal of the welding pressure from tubes A and B. The same relay 114 may, if desired, also be used to disconnect transformer 50 from generator 52 at 55 and discontinue the heating current supplied to inductor C—C'; also to close the gas supply valve 58 and the cooling water valve 46.

In situations where the prolongation of the inductive heating current beyond the removal of welding pressure (from envelopes P—P') may be desired, the control hookup of FIG. 7 may of course be modified so that transformer 50 is not disconnected from generator 52 when the switch contact 115 closes. Such heating prolongation accomplishes what is spoken of as "soaking," and it serves the useful purpose of allowing grain growth across the metal interfaces of the tube juncture 10 to take place. The duration of such "soaking" period may be of the order of one minute or more.

At the end of the "soaking" time, when provided for, the heating current is cut off by opening power switch 53. This completes the welding cycle.

Still referring to FIG. 7, the upper shell half 18' of the welding unit is now opened upwardly and away from the welded-together tubes A and B. The procedure followed in accomplishing such opening is fully described by copending application Serial No. 858,544 and hence will not be repeated here.

Instead it will suffice to say that such opening of the upper shell half 18' away from the stationary lower shell 18 is accompanied by simultaneous upward movement of clamp block halves 12' and 14' away from the stationary block halves 12 and 14 and from the welded-together tubes A and B lying therein; also by simultaneous upward swinging of expansible envelope P' away from the stationary envelope P.

The two free ends of inductor coil halves C—C' now are unclamped at 118—118', and the top coil half C' swung upwardly around hinge bolt 49 to the open position of FIG. 6.

This fully frees the welded-together tubes A and B for a removal from the lower shell half 18. Once such removal has been accomplished the apparatus is in readiness for receiving two more tube lengths and also welding them together.

*Summary*

In practice, highly successful results are obtainable from the novel inductor coil construction when incorporated into apparatus of the type represented by FIG. 7 and more fully shown and described by copending application Serial No. 858,544.

A significant practical advantage of this new coil with integral flux concentrators 60—60' is the cooling organization involving passages 42 which cool not only the metal of coil C—C', but also the material 60—60' that directly surrounds such coil metal.

Because of this feature the coil C—C' with said novel flux concentrators 60—60' can successfully be incorporated into the compact welding unit of FIG. 7. This unit being both rugged and portable lends itself admirably to use at field installations as well as in the fabricating shop.

My inventive improvements are therefore extensive in their application and are not to be restricted to the specific form here disclosed by way of illustration.

What I claim is:

1. In apparatus for butt welding the ends of metal tubes, means for holding said tube ends in aligned and abutting relation; an inductor heating coil comprising a conductor divided into first and second mating parts detachable one from the other and cooperable when placed together to encircle the abutting tube ends with radial spacing between conductor and tube exteriors, said two-part conductor serving when energized to create a field of high frequency alternating magnetic flux that imparts inductive heating to said tube edge portions; flux concentrator members formed of iron particles dispersed through and carried in a binder of insulating substance integrally secured to and flanking the left and right sides of each of said first and second conductor parts and extending inwardly along those sides toward the encircled tubes into radially spaced proximity thereto, said members being nonconductive electrically and serving to concentrate flow of magnetic flux from the conductor more narrowly into the extreme edge portions of said surrounded tube ends; passages in said first and second conductor parts adjacent the left and right sides of said first and second conductor parts through which there can be circulated a cooling fluid that carries heat away both from the conductor parts and said flux concentrator members with resultant maintenance of said conductor parts and said flux concentrator members at suitably low temperatures during the entire cycle of tube heating and welding, outer left and right side walls of non-magnetic metal for each of said first and second conductor-parts secured to and flanking the left and right flux concentrator members thereof and adapted for fitting around the encircled tubes more closely than the flux concentrator members but still with radial spacing; and tube-contactable inserts carried by the inner edges of said left and right side walls of said first and second conductor-parts, said inserts being adapted for fitting around the encircled tubes in a snug and close way which assures proper centering of the inductor heating coil with respect to those tubes when the first and second conductor parts are placed therearound and which also then electrically insulates the metal of those side walls from the tube metal, said inserts, left and right side walls, conductor parts, and flux concentrator members forming an enclosed chamber which communicates with said surrounded tube ends throughout their full circumference, a source of protective gas effective to prevent oxidation of the tube ends when brought into contact therewith, means carried by said conductor parts connecting said source with said chamber and serving to supply said protective gas to the chamber interior, and means for pressing together the said abutted tube ends whereby to effect welding thereof by the inductor heating coil.

2. The apparatus set forth in claim 1, whereby said means connecting said source with said chamber introduces the protective gas into the chamber tangentially to the cylindrical wall formed by the inner surface of the conductor parts.

References Cited in the file of this patent

UNITED STATES PATENTS

| 2,337,949 | Walle | Dec. 28, 1943 |
| 2,649,527 | Chapman et al. | Aug. 18, 1953 |

FOREIGN PATENTS

| 467,308 | Great Britain | June 15, 1937 |